(12) United States Patent
Rakib et al.

(10) Patent No.: US 8,185,568 B2
(45) Date of Patent: May 22, 2012

(54) METHOD OF PROVIDING SPACE FILLING PATTERNS

(76) Inventors: Shlomo Selim Rakib, Cupertino, CA (US); Yoram Zarai, San Jose, CA (US)

( * ) Notice: Subject to any disclaimer, the term of this patent is extended or adjusted under 35 U.S.C. 154(b) by 1068 days.

(21) Appl. No.: 12/054,339

(22) Filed: Mar. 24, 2008

(65) Prior Publication Data

US 2009/0240755 A1   Sep. 24, 2009

(51) Int. Cl.
*G06F 17/14* (2006.01)
(52) U.S. Cl. .......................... 708/401; 708/400
(58) Field of Classification Search .......... None
See application file for complete search history.

(56) References Cited

U.S. PATENT DOCUMENTS

| | | |
|---|---|---|
| 2003/0174905 A1 | 9/2003 | Craver et al. |
| 2003/0194116 A1 | 10/2003 | Wong et al. |
| 2004/0177065 A1* | 9/2004 | Tropf ........................ 707/3 |
| 2005/0063601 A1 | 3/2005 | Kamata et al. |
| 2006/0184519 A1 | 8/2006 | Smartt |
| 2007/0070070 A1 | 3/2007 | John |
| 2007/0104378 A1 | 5/2007 | Aguera Y Arcas |

OTHER PUBLICATIONS

Haase, G., et al., "A Hilbert Order Multiplication Scheme for Unstructured Sparse Matricies", *Institute of Mathmatics*, University of Graz, Report No. 3/2005, Oct. 2005, pp. 1-10.
Moon, B., et al., "Analysis of the Clustering Properties of the Hilbert Space-Filing Curve", *IEEE Trans. Knowledge and Data Eng.*, vol. 13, No. 1, Jan./Feb. 2001, pp. 124-141.
Sagan, et al. *Space Filling Curves*, Springer-Verlag, 1994, Ch. 2.

* cited by examiner

*Primary Examiner* — Lewis A Bullock, Jr.
*Assistant Examiner* — Michael D Yaary
(74) *Attorney, Agent, or Firm* — Stephen E. Zweig

(57) ABSTRACT

Methods of generating Hilbert space-filling indexes using simple bit-wise transformation are described herein. One method is based on a linear-based transformation uses bit-wise AND and XOR operations on a simple input index counter. In another method, the regular structure of the transform matrix was then used to obtain a Gray-based transform at a reduced complexity. Due to the simple and regular structure of the transformation, an efficient hardware implementation of generating indexes (addresses) along the Hilbert curve results.

4 Claims, 5 Drawing Sheets

METHOD OF PROVIDING SPACE FILLING PATTERNS

FIELD OF THE INVENTION

The present invention is related to a method of providing space filling patterns.

BACKGROUND OF THE INVENTION

It is known to align matrix data in different ways, in order to use the data for different purposes. One method of aligning data is to use a transform, such as a matrix transform for Hilbert space-filling curve, and once aligned in a pattern according to the transform, the data can be used for different purposes.

The Hilbert curve is a one-to-one mapping between a two-dimensional (2-D) space and one-dimensional space that preserve the locality presented in the 2-D space. A mathematical history of the Hilbert space-filling curve can be found in H. Sagan, Space-Filling Curves. Springer-Verlag, 1994, ch. 2. The clustering (locality between objects) properties of the curve are discussed in B. Moon, H. V. Jagadish, C. Faloutsos, and J. H. Slatz, "Analysis of the Clustering Properties of the Hilbert Space-Filling Curve," IEEE Trans. Knowledge and Data Eng., vol. 13, no. 1, pp. 124-141, January/February 2001.

The Hilbert curve is useful in many applications where a locality-preserving mapping is required, such as R-tree indexing, process allocation, VLSI component layout and many more. In particular, the Hilbert curve is used in a variety of image processing algorithms, such as image compression, textural analysis, image segmentation and Holographic image sampling to name a few.

Several methods of Hilbert scanning have been proposed, among them scanning by using Tensor operations and look-up tables. These methods, however do not efficiently and automatically align matrix data from one form to another for certain transforms.

SUMMARY OF THE INVENTION

Methods of generating Hilbert space-filling indexes using simple bit-wise transformation are described herein.

One method is based on a linear-based transformation uses bit-wise AND and XOR operations on a simple input index counter.

In another method, the regular structure of the transform matrix was then used to obtain a Gray-based transform at a reduced complexity. Due to the simple and regular structure of the transformation, an efficient hardware implementation of generating indexes (addresses) along the Hilbert curve results.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

With respect to the Hilbert transform, in a famous 1891 paper, D. Hilbert wrote that the function required for constructing the Hilbert space-filling curve can be represented in a lucid manner, if one avails oneself of its special geometric insight. The insight Hilbert was referring to is based on the fractal structure of the filling curve, where for each quadrant of the space, for each sub-space, the sub-curve follows the same structure as the curve in the lower order space (with rotations and reflections). The present invention uses this insight to formulate a general transform for generating the Hilbert space-filling indexes. A natural extension is an K-dimensional Hilbert space-filling transformation.

Due to its locality-preserving property, the Hilbert space-filling curve is used in a variety of applications, where data mapping from multiple-dimensions to one-dimension is required while preserving data clustering. An efficient algorithm to calculate the data indexes along the curve can then be considered as an address generation unit, serving the DSP application. Provided herein are various transformations based essentially on two index transformation methods using simple bit operations. A simple counter-based Hilbert transformation is derived first. By using the regular structure of the transform matrix, a significant complexity reduction is achieved by basing the Hilbert transform on Gray indexes, and one in which all computation are preferably done over GF(2). These methods lend themselves to a simple and/or efficient hardware implementation that can be implemented on a computer that has software, firmware, or a combination of both that implement a program that contains the functions described herein.

Introduction

This document provides the matrix settings and illustration figures for the Hilbert space-filling curves.

The general transform is provided in the following equation:

$$\text{out}=T(*)\text{in}(+)B, \qquad [1]$$

where, "in" is the address of the input index, presented as a column vector where the first row of the vector is the LSB of the address and the last row of the vector is the MSB of the address. "T" is the transform matrix, "B" is the offset column vector, (*) denotes a matrix multiply using AND and XOR operations and (+) is the XOR operation. "out" is the address of the transform index, presented as a column vector as well.

The following information is provided for an 8×8 matrix transform (N=8).

Hilbert Filling

Figure 1:
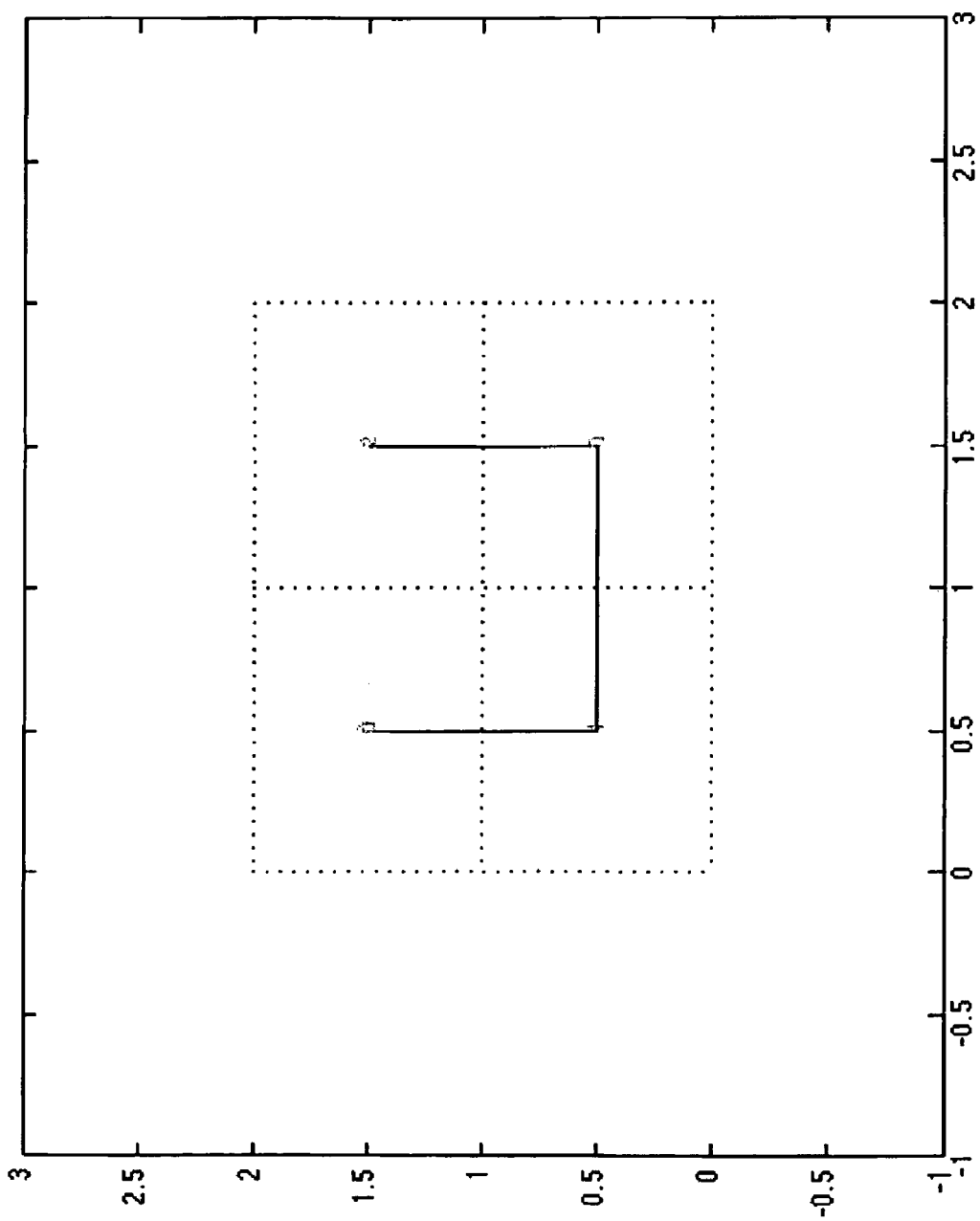
FIG. 1 illustrates Hilbert Filling for N=2.

For N=2 (4 elements), the transform parameters are:

T=[1, 1; . . . 0, 1];

B=[0, 0];

FIG. 1 illustrates Hilbert filling for N=2. Following are the Hilbert order indexes:

0, 1, 3, 2

Hilbert Filling using Parameterize Matrix

Even though the Hilbert filling pattern cannot be described as a constant linear matrix transformation, there is a description using a parameterize matrix.

Following are examples of Hilbert filling descriptions for N equals 4 to 10.

Hilbert 4

For N=4 (16 elements), the input index is described with 4 bits: c1c0r1r0, where r0 is the LSB and c1 is the MSB.
Define:

$$x=c0+c1,$$

where the operator "+" denotes a XOR operation.
Then, define the following matrix:

$$T = \begin{vmatrix} x & 1 & 0 & \bar{x} \\ 0 & 0 & 1 & 1 \\ \bar{x} & 1 & 0 & \bar{x} \\ 0 & 0 & 0 & 1 \end{vmatrix}$$

The Hilbert indexes are then described as the "T" transform of the input indexes:

$$\text{Out}=T(*)\text{in}(+)B,$$

where B is a vector of zeros.

Figure 2:
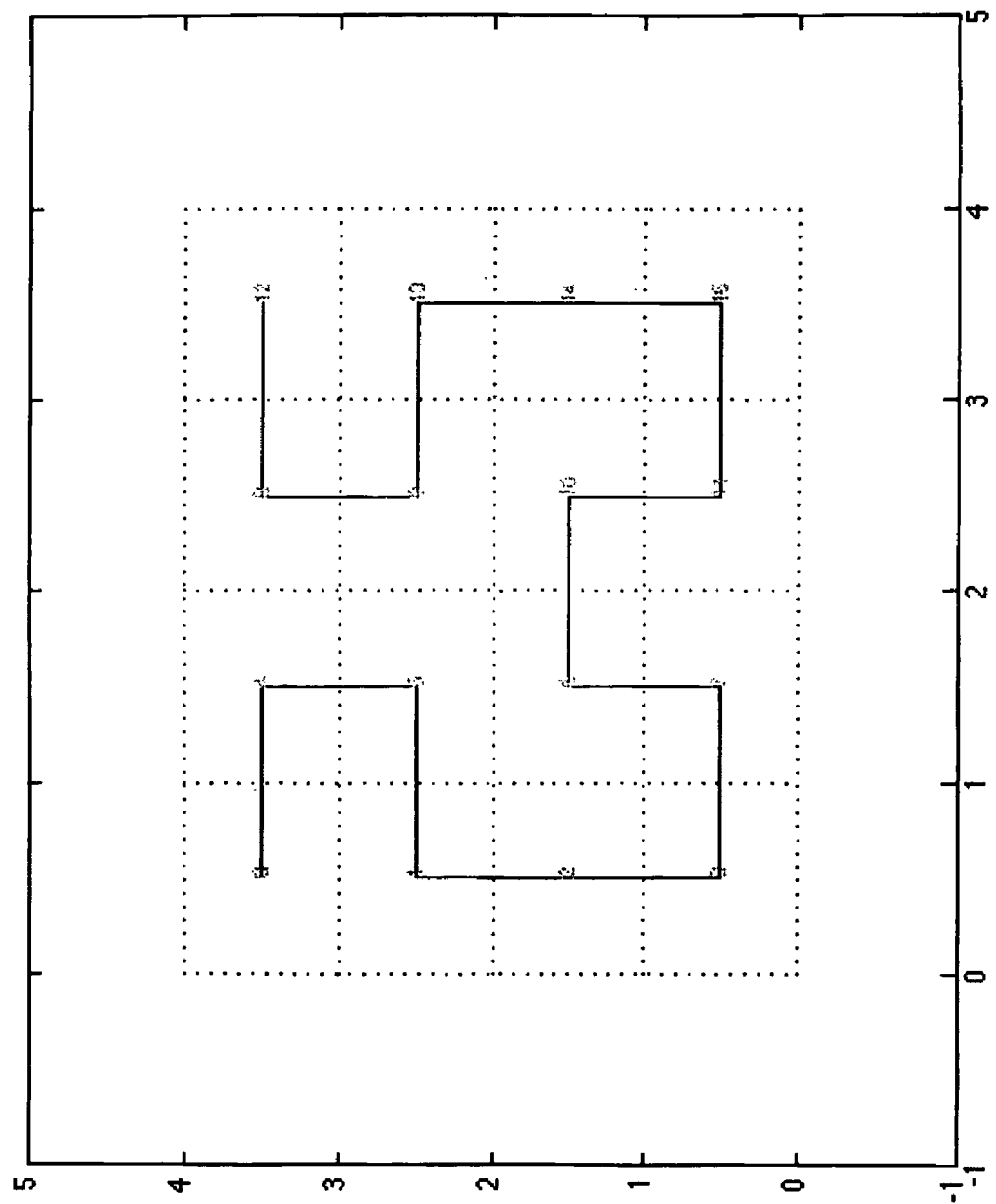
FIG. 2 illustrates Hilbert Filling for N=4.

FIG. 2 illustrates Hilbert Filling for N=4. Following are the Hilbert order indexes:

0, 4, 5, 1, 2, 3, 7, 6, 10, 11, 15, 14, 13, 9, 8, 12

Hilbert 6

For N=6 (64 elements), the input index is described with 6 bits: c2c1c0r2r1r0, where r0 is the LSB and c2 is the MSB.
Define:

$$x=c0+c2,$$

$$y=c1+c2$$

where the operator "+" denotes a XOR operation.
Then, define the following matrix:

$$T = \begin{vmatrix} \bar{x}+y & 1 & 0 & \bar{x} & 0 & \bar{y} \\ 0 & 0 & y & 1 & 0 & \bar{y} \\ 0 & 0 & 0 & 0 & 1 & 1 \\ x+y & 1 & 0 & \bar{x} & 0 & \bar{y} \\ 0 & 0 & y & 1 & 0 & \bar{y} \\ 0 & 0 & 0 & 0 & 0 & 1 \end{vmatrix}$$

where the operator "+" denotes a XOR operation.
The Hilbert indexes are then described as the "T" transform of the input indexes:

$$\text{Out}=T(*)\text{in}(+)B,$$

where B is a vector of zeros.

Figure 3:
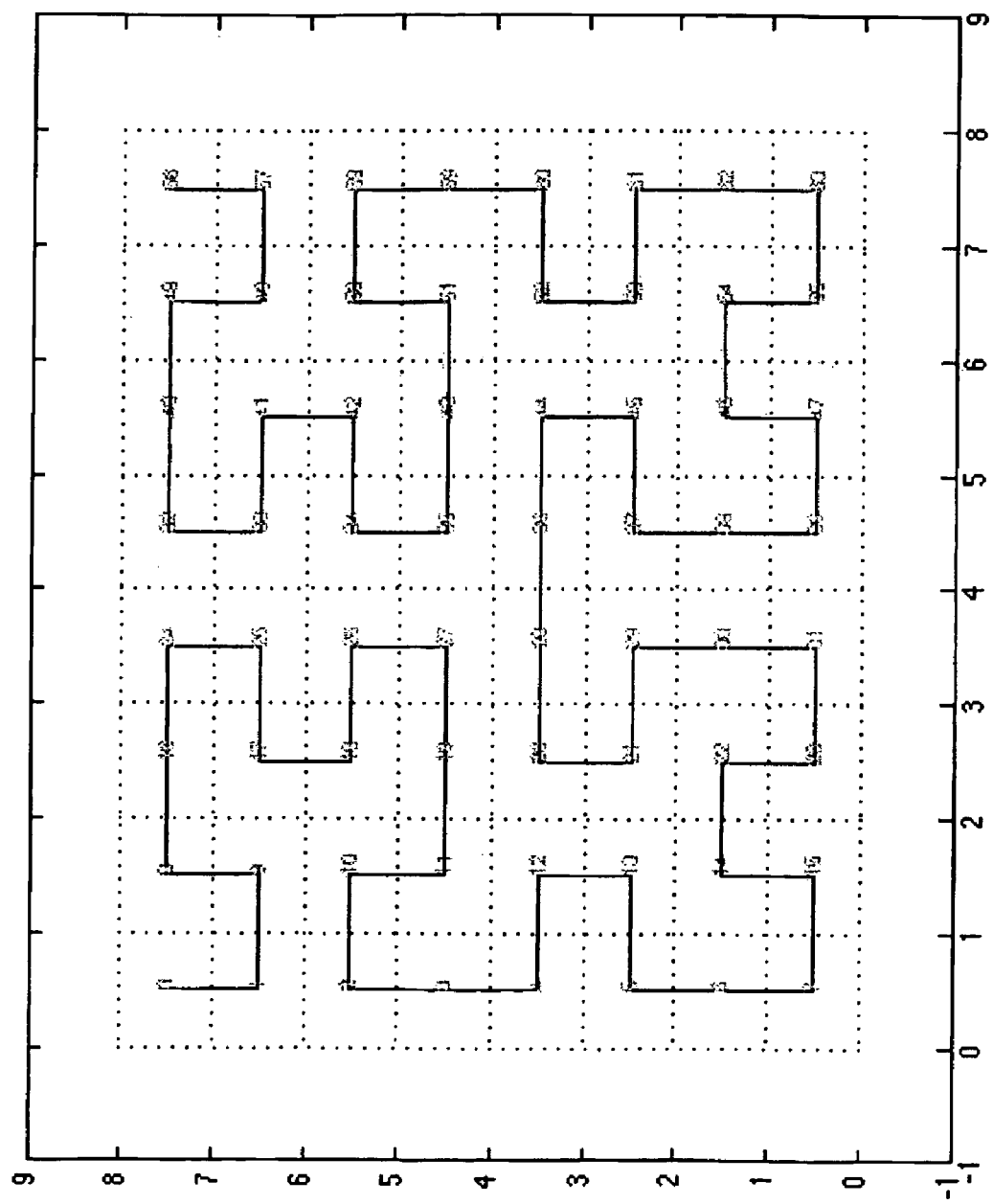
FIG. 3 illustrates Hilbert Filling for N=6.

FIG. 3 illustrates Hilbert Filling for N=6. Following are the Hilbert order indexes:

0, 1, 9, 8, 16, 24, 25, 17, 18, 26, 27, 19, 11, 10, 2, 3,
4, 12, 13, 5, 6, 7, 15, 14, 22, 23, 31, 30, 29, 21, 20, 28,
36, 44, 45, 37, 38, 39, 47, 46, 54, 55, 63, 62, 61, 53, 52, 60,
59, 58, 50, 51, 43, 35, 34, 42, 41, 33, 32, 40, 48, 49, 57, 56

Hilbert 8

For N=8 (256 elements), the input index is described with 8 bits: c3c2c1c0r3r2r1r0, where r0 is the LSB and c3 is the MSB.
Define:

$$x=r3+r2,$$

$$y=c0+c1$$

$$z=c2+c3$$

where the operator "+" denotes a XOR operation.

Then, define the following matrix:

$$T = \begin{vmatrix} x+y+z & 1 & 0 & \bar{x} & 0 & \bar{y} & 0 & \bar{z} \\ 0 & 0 & \overline{y+z} & 1 & 0 & \bar{y} & 0 & \bar{z} \\ 0 & 0 & 0 & 0 & z & 1 & 0 & \bar{z} \\ 0 & 0 & 0 & 0 & 0 & 0 & 1 & 1 \\ \overline{x+y+z} & 1 & 0 & \bar{x} & 0 & \bar{y} & 0 & \bar{z} \\ 0 & 0 & y+z & 1 & 0 & \bar{y} & 0 & \bar{z} \\ 0 & 0 & 0 & 0 & \bar{z} & 1 & 0 & \bar{z} \\ 0 & 0 & 0 & 0 & 0 & 0 & 0 & 1 \end{vmatrix}$$

where the operator "+" denotes a XOR operation.
The Hilbert indexes are then described as the "T" transform of the input indexes:

$$\text{Out}=T(*)\text{in}(+)B,$$

where B is a vector of zeros.

Figure 4:
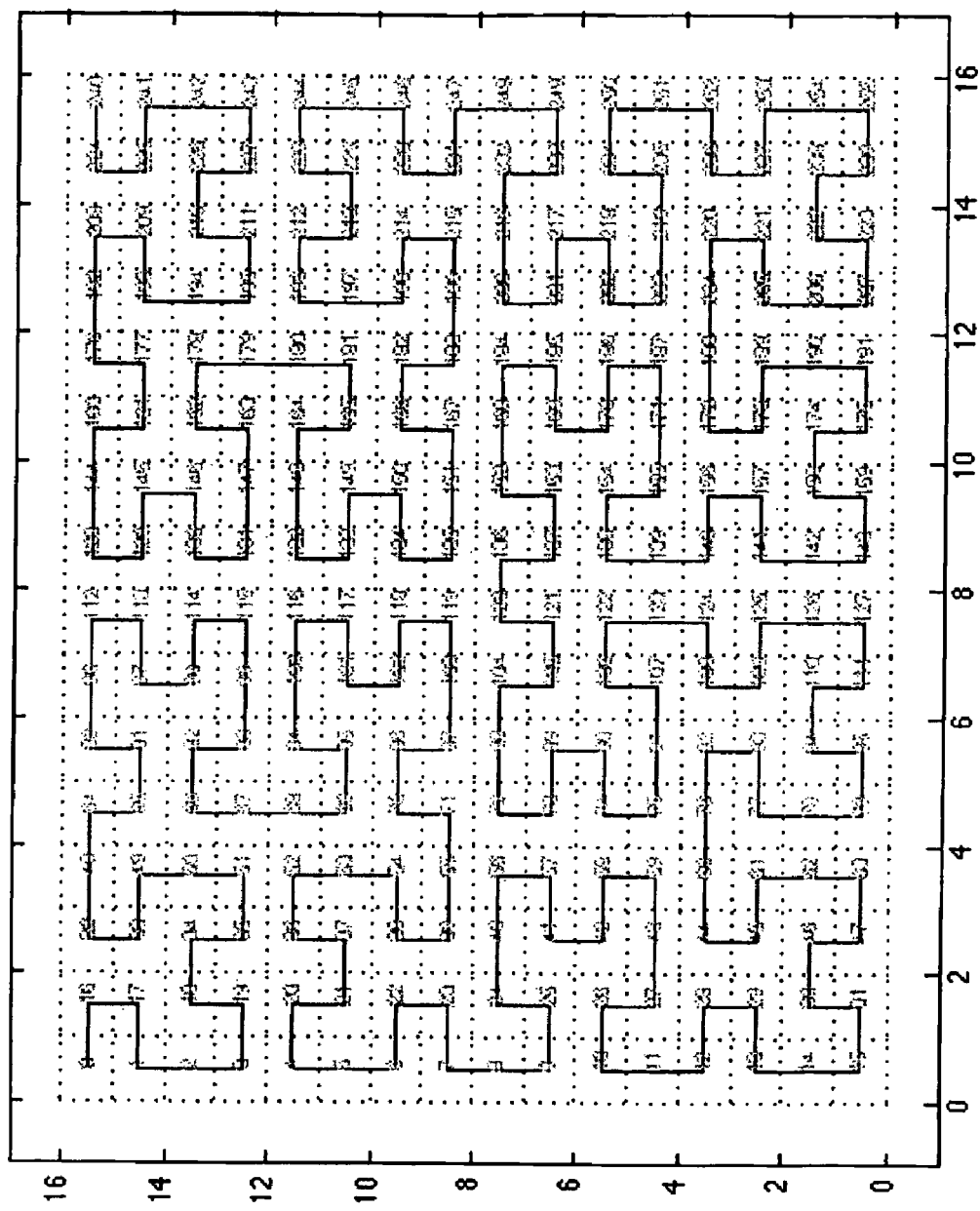
FIG. 4 illustrates Hilbert Filling for N=8.

FIG. 4 illustrates Hilbert Filling for N=8. Following are the Hilbert order indexes:

0, 16, 17, 1, 2, 3, 19, 18, 34, 35, 51, 50, 49, 33, 32, 48,
64, 65, 81, 80, 96, 112, 113, 97, 98, 114, 115, 99, 83, 82, 66, 67,
68, 69, 85, 84, 100, 116, 117, 101, 102, 118, 119, 103, 87, 86, 70, 71,
55, 39, 38, 54, 53, 52, 36, 37, 21, 20, 4, 5, 6, 22, 23, 7,
8, 9, 25, 24, 40, 56, 57, 41, 42, 58, 59, 43, 27, 26, 10, 11,
12, 28, 29, 13, 14, 15, 31, 30, 46, 47, 63, 62, 61, 45, 44, 60,
76, 92, 93, 77, 78, 79, 95, 94, 110, 111, 127, 126, 125, 109, 108, 124,
123, 122, 106, 107, 91, 75, 74, 90, 89, 73, 72, 88, 104, 105, 121, 120,
136, 137, 153, 152, 168, 184, 185, 169, 170, 186, 187, 171, 155, 154, 138, 139,
140, 156, 157, 141, 142, 143, 159, 158, 174, 175, 191, 190, 189, 173, 172, 188,
204, 220, 221, 205, 206, 207, 223, 222, 238, 239, 255, 254, 253, 237, 236, 252,
251, 250, 234, 235, 219, 203, 202, 218, 217, 201, 200, 216, 232, 233, 249, 248,
247, 231, 230, 246, 245, 244, 228, 229, 213, 212, 196, 197, 198, 214, 215, 199,
183, 182, 166, 167, 151, 135, 134, 150, 149, 133, 132, 148, 164, 165, 181, 180,
179, 178, 162, 163, 147, 131, 130, 146, 145, 129, 128, 144, 160, 161, 177, 176,
192, 208, 209, 193, 194, 195, 211, 210, 226, 227, 243, 242, 241, 225, 224, 240

Hilbert 10

For N=10 (1024 elements), the input index is described with 10 bits: c4c3c2c1c0r4r3r2r1r0, where r0 is the LSB and c4 is the MSB.
Define:

$$x=r3+r2,$$

$$y=c0+r4$$

$$z=c2+c1$$

$$q=c3+c4$$

where the operator "+" denotes a XOR operation.

Then, define the following matrix:

$$T = \begin{bmatrix} \overline{x+y+z+q} & 1 & 0 & \overline{x} & 0 & \overline{y} & 0 & \overline{z} & 0 & \overline{q} \\ 0 & 0 & \overline{y+z+q} & 1 & 0 & \overline{y} & 0 & \overline{z} & 0 & \overline{q} \\ 0 & 0 & 0 & 0 & \overline{z+q} & 1 & 0 & \overline{z} & 0 & \overline{q} \\ 0 & 0 & 0 & 0 & 0 & 0 & \overline{q} & 1 & 0 & \overline{q} \\ 0 & 0 & 0 & 0 & 0 & 0 & 0 & 0 & 1 & 1 \\ x+y+z+q & 1 & 0 & \overline{x} & 0 & \overline{y} & 0 & \overline{z} & 0 & \overline{q} \\ 0 & 0 & \overline{y+z+q} & 1 & 0 & \overline{y} & 0 & \overline{z} & 0 & \overline{q} \\ 0 & 0 & 0 & 0 & z+q & 1 & 0 & \overline{z} & 0 & \overline{q} \\ 0 & 0 & 0 & 0 & 0 & 0 & \overline{q} & 1 & 0 & \overline{q} \\ 0 & 0 & 0 & 0 & 0 & 0 & 0 & 0 & 0 & 1 \end{bmatrix}$$

where the operator "+" denotes a XOR operation.

The Hilbert indexes are then described as the "T" transform of the input indexes:

$$\text{Out} = T(*)\text{in}(+)B,$$

where B is a vector of zeros.

Figure 5:
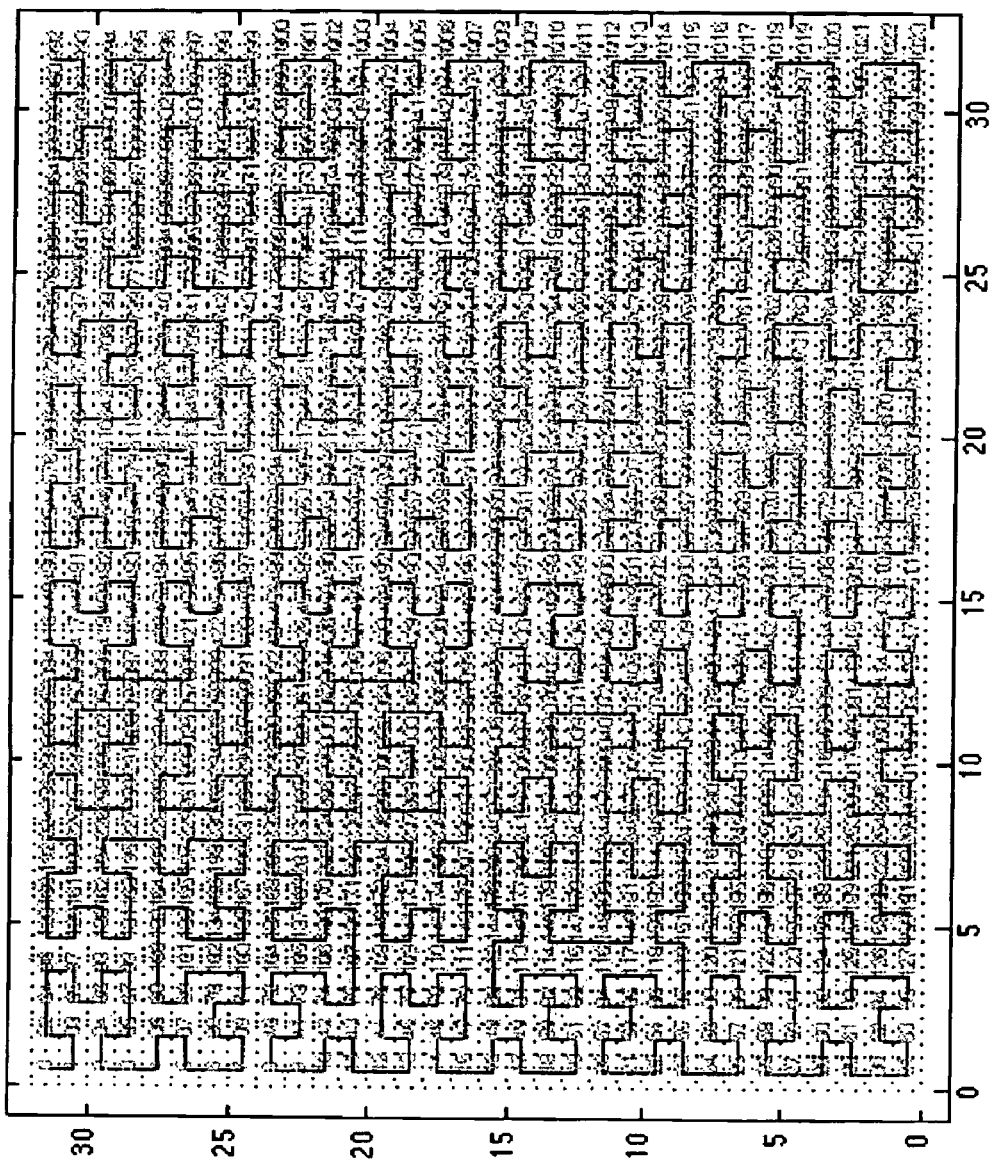
FIG. 5 illustrates Hilbert Filling for N=10.

FIG. 5 illustrates Hilbert Filling for N=10. Following are the Hilbert order indexes:

0, 1, 33, 32, 64, 96, 97, 65, 66, 98, 99, 67, 35, 34, 2, 3,
4, 36, 37, 5, 6, 7, 39, 38, 70, 71, 103, 102, 101, 69, 68, 100,
132, 164, 165, 133, 134, 135, 167, 166, 198, 199, 231, 230, 229, 197, 196, 228,
227, 226, 194, 195, 163, 131, 130, 162, 161, 129, 128, 160, 192, 193, 225, 224,
256, 288, 289, 257, 258, 259, 291, 290, 322, 323, 355, 354, 353, 321, 320, 352,
384, 385, 417, 416, 448, 480, 481, 449, 450, 482, 483, 451, 419, 418, 386, 387,
388, 389, 421, 420, 452, 484, 485, 453, 454, 486, 487, 455, 423, 422, 390, 391,
359, 327, 326, 358, 357, 356, 324, 325, 293, 292, 260, 261, 262, 294, 295, 263,
264, 296, 297, 265, 266, 267, 299, 298, 330, 331, 363, 362, 361, 329, 328, 360,
392, 393, 425, 424, 456, 488, 489, 457, 458, 490, 491, 459, 427, 426, 394, 395,
396, 397, 429, 428, 460, 492, 493, 461, 462, 494, 495, 463, 431, 430, 398, 399,
367, 335, 334, 366, 365, 364, 332, 333, 301, 300, 268, 269, 270, 302, 303, 271,
239, 238, 206, 207, 175, 143, 142, 174, 173, 141, 140, 172, 204, 205, 237, 236,
235, 203, 202, 234, 233, 232, 200, 201, 169, 168, 136, 137, 138, 170, 171, 139,
107, 75, 74, 106, 105, 104, 72, 73, 41, 40, 8, 9, 10, 42, 43, 11,
12, 13, 45, 44, 76, 108, 109, 77, 78, 110, 111, 79, 47, 46, 14, 15,
16, 48, 49, 17, 18, 19, 51, 50, 82, 83, 115, 114, 113, 81, 80, 112,
144, 145, 177, 176, 208, 240, 241, 209, 210, 242, 243, 211, 179, 178, 146, 147,
148, 149, 181, 180, 212, 244, 245, 213, 214, 246, 247, 215, 183, 182, 150, 151,
119, 87, 86, 118, 117, 116, 84, 85, 53, 52, 20, 21, 22, 54, 55, 23,
24, 25, 57, 56, 88, 120, 121, 89, 90, 122, 123, 91, 59, 58, 26, 27,
28, 60, 61, 29, 30, 31, 63, 62, 94, 95, 127, 126, 125, 93, 92, 124,
156, 188, 189, 157, 158, 159, 191, 190, 222, 223, 255, 254, 253, 221, 220, 252,
251, 250, 218, 219, 187, 155, 154, 186, 185, 153, 152, 184, 216, 217, 249, 248,
280, 281, 313, 312, 344, 376, 377, 345, 346, 378, 379, 347, 315, 314, 282, 283,
284, 316, 317, 285, 286, 287, 319, 318, 350, 351, 383, 382, 381, 349, 348, 380,
412, 444, 445, 413, 414, 415, 447, 446, 478, 479, 511, 510, 509, 477, 476, 508,
507, 506, 474, 475, 443, 411, 410, 442, 441, 409, 408, 440, 472, 473, 505, 504,
503, 471, 470, 502, 501, 500, 468, 469, 437, 436, 404, 405, 406, 438, 439, 407,
375, 374, 342, 343, 311, 279, 278, 310, 309, 277, 276, 308, 340, 341, 373, 372,
371, 370, 338, 339, 307, 275, 274, 306, 305, 273, 272, 304, 336, 337, 369, 368,
400, 432, 433, 401, 402, 403, 435, 434, 466, 467, 499, 498, 497, 465, 464, 496,
528, 560, 561, 529, 530, 531, 563, 562, 594, 595, 627, 626, 625, 593, 592, 624,
656, 657, 689, 688, 720, 752, 753, 721, 722, 754, 755, 723, 691, 690, 658, 659,
660, 661, 693, 692, 724, 756, 757, 725, 726, 758, 759, 727, 695, 694, 662, 663,
631, 599, 598, 630, 629, 628, 596, 597, 565, 564, 532, 533, 534, 566, 567, 535,
536, 537, 569, 568, 600, 632, 633, 601, 602, 634, 635, 603, 571, 570, 538, 539,
540, 572, 573, 541, 542, 543, 575, 574, 606, 607, 639, 638, 637, 605, 604, 636,
668, 700, 701, 669, 670, 671, 703, 702, 734, 735, 767, 766, 765, 733, 732, 764,
763, 762, 730, 731, 699, 667, 666, 698, 697, 665, 664, 696, 728, 729, 761, 760,
792, 793, 825, 824, 856, 888, 889, 857, 858, 890, 891, 859, 827, 826, 794, 795,
796, 828, 829, 797, 798, 799, 831, 830, 862, 863, 895, 894, 893, 861, 860, 892,
924, 956, 957, 925, 926, 927, 959, 958, 990, 991, 1023, 1022, 1021, 989, 988, 1020,
1019, 1018, 986, 987, 955, 923, 922, 954, 953, 921, 920, 952, 984, 985, 1017, 1016,
1015, 983, 982, 1014, 1013, 1012, 980, 981, 949, 948, 916, 917, 918, 950, 951, 919,
887, 886, 854, 855, 823, 791, 790, 822, 821, 789, 788, 820, 852, 853, 885, 884,
883, 882, 850, 851, 819, 787, 786, 818, 817, 785, 784, 816, 848, 849, 881, 880,
912, 944, 945, 913, 914, 915, 947, 946, 978, 979, 1011, 1010, 1009, 977, 976, 1008,
1007, 1006, 974, 975, 943, 911, 910, 942, 941, 909, 908, 940, 972, 973, 1005, 1004,
1003, 971, 970, 1002, 1001, 1000, 968, 969, 937, 936, 904, 905, 906, 938, 939, 907,
875, 843, 842, 874, 873, 872, 840, 841, 809, 808, 776, 777, 778, 810, 811, 779,
780, 781, 813, 812, 844, 876, 877, 845, 846, 878, 879, 847, 815, 814, 782, 783,
751, 719, 718, 750, 749, 748, 716, 717, 685, 684, 652, 653, 654, 686, 687, 655,
623, 622, 590, 591, 559, 527, 526, 558, 557, 525, 524, 556, 588, 589, 621, 620,
619, 618, 586, 587, 555, 523, 522, 554, 553, 521, 520, 552, 584, 585, 617, 616,
648, 680, 681, 649, 650, 651, 683, 682, 714, 715, 747, 746, 745, 713, 712, 744, 743, 711, 710, 742, 741, 740, 708, 709, 677, 676, 644, 645, 646, 678, 679, 647,
615, 614, 582, 583, 551, 519, 518, 550, 549, 517, 516, 548, 580, 581, 613, 612,
611, 610, 578, 579, 547, 515, 514, 546, 545, 513, 512, 544, 576, 577, 609, 608,
640, 672, 673, 641, 642, 643, 675, 674, 706, 707, 739, 738, 737, 705, 704, 736,
768, 769, 801, 800, 832, 864, 865, 833, 834, 866, 867, 835, 803, 802, 770, 771,
772, 804, 805, 773, 774, 775, 807, 806, 838, 839, 871, 870, 869, 837, 836, 868,
900, 932, 933, 901, 902, 903, 935, 934, 966, 967, 999, 998, 997, 965, 964, 996,
995, 994, 962, 963, 931, 899, 898, 930, 929, 897, 896, 928, 960, 961, 993, 992

Hilbert Transform Matrix Property

This section describes the property of the general Hilbert transform matrix T and presents a method to construct the matrix for all N.

Given N as the Hilbert matrix size (as shown in the previous sections), we will denote the input index as a string of binary digits:

$$I_l = [i_{N-1}, i_{N-2}, \ldots i_0], \text{ for } l=0, \ldots 2^N-1, \qquad [2]$$

where $i_k \subset \{0,1\}$ is a binary digit, $i_{N-1}$ is the MSB and $i_0$ is the LSB.

Define digit sum as:

$$s_n = i_{2(n+1)} + i_{2(n+1)+1}, \text{ for } n=0, \ldots K \qquad [3]$$

where $K = \frac{N}{2} - 2$.

Define the following partial sum:

$$\sigma_l = \sum_{n=l}^{K} s_n, \text{ for } l = 0, \ldots K \qquad [4]$$

Then, the structure of the Hilbert transform matrix T is as follows:

$$T_{N \times N} = \begin{bmatrix} \sigma_0 & 1 & 0 & \bar{s}_0 & 0 & \bar{s}_1 & 0 & \bar{s}_2 & 0 & \ldots & 0 & \bar{s}_K \\ 0 & 0 & \bar{\sigma}_1 & 1 & 0 & \bar{s}_1 & 0 & \bar{s}_2 & 0 & \ldots & 0 & \bar{s}_K \\ 0 & 0 & 0 & 0 & \sigma_2 & 1 & 0 & \bar{s}_2 & 0 & \ldots & 0 & \bar{s}_K \\ 0 & 0 & 0 & 0 & 0 & 0 & \bar{\sigma}_3 & 1 & 0 & \ldots & 0 & \bar{s}_K \\ \ldots & \ldots & \ldots & \ldots & \ldots & \ldots & \ldots & \ldots & \ldots & & 0 & \bar{s}_K \\ 0 & 0 & 0 & 0 & 0 & 0 & 0 & 0 & 0 & \ldots & 1 & 1 \\ \bar{\sigma}_0 & 1 & 0 & \bar{s}_0 & 0 & \bar{s}_1 & 0 & \bar{s}_2 & 0 & \ldots & 0 & \bar{s}_K \\ 0 & 0 & \sigma_1 & 1 & 0 & \bar{s}_1 & 0 & \bar{s}_2 & 0 & \ldots & 0 & \bar{s}_K \\ 0 & 0 & 0 & 0 & \bar{\sigma}_2 & 1 & 0 & \bar{s}_2 & 0 & \ldots & 0 & \bar{s}_K \\ 0 & 0 & 0 & 0 & 0 & 0 & \sigma_3 & 1 & 0 & \ldots & 0 & \bar{s}_K \\ \ldots & \ldots & \ldots & \ldots & \ldots & \ldots & \ldots & \ldots & \ldots & & 0 & \bar{s}_K \\ 0 & 0 & 0 & 0 & 0 & 0 & 0 & 0 & 0 & \ldots & 0 & 1 \end{bmatrix} \qquad [5]$$

The structure of the matrix in [5] is for even N/2. For odd N/2, the first non-zero element in each row (which is the σ element) is inverted. So, for example, for N=10, the first element in the first row is $\bar{\sigma}_0$.

As can be notice, the matrix has the following properties:

The N/2 bottom rows are identical to the upper N/2 rows except that the first non-zero element in each N/2 bottom row is negated relative to its counterpart (N/2 rows above it).

The first non-zero element is a partial sum. First row starts with first partial sum ($\sigma_0$), second row starts with 2 zeros follows by the second partial sum, and so on. The number of preceding zeros in each row is 2*(m−1), where 'm' is the row number (starting from 1).

Following the partial sum is a 1 followed by a pattern of zero and digit sum, where the digit sum starts from (m−1), where 'm' is the row number. Row N/2 is equal to N−2 zeros followed by two '1's.

Thus, given N, construct the Hilbert transform matrix T as follows:

1. Set I=0 (first input index).
2. Compute digit sums using [3].
3. Compute partial sums using [4].
4. Construct the transform matrix using [5].
5. Compute output index using [1], where B=0 and 'in'=I.
6. Set I=I+1 (next input index). If I==N stop, otherwise go to 2.

In other words, given an input index to the transform operation, the transform matrix is constructed as a function of the input index digits (digit sum and partial sum as shown in [3] and [4]). This matrix is then used to transform the input index to a Hilbert index following the linear transform equation [1].

Gray Based Space Filling

Space filling based on Gray indexing benefit from the fact that only one bit is changing between two consecutive Gray indexes. The Gray indexes serve as the source indexes for the space filling transform operation (as oppose to linear indexes, which were considered in the previous sections). The motivation for using a Gray-based index (having only one bit change between two consecutive Gray indexes) is to reduce the computational complexity.

In general, the space filling transform is defined as (we are omitting here the addition of an offset vector):

$$p_n = Tk_n \qquad [6]$$

where T is the transform matrix, k is the input index (input address bits) and p is the output index (output address bits).

A Gray mapping is then defined as follows:

$$g_n = GK_n \qquad [7]$$

and its inverse mapping as, $$k_n = G^{-1} g_n. \qquad [8]$$

where G is the Gray mapping transform.

Using the Gray indexes as the base indexes, the general space filling transform is then equal to:

$$p_n = T(G^{-1} g_n) = (TG^{-1}) g_n = T_G g_n \qquad [9]$$

For N=8, the Gray mapping matrix is:

$$G = [\,1, \quad 1, \quad 0, \quad 0, \quad 0, \quad 0, \quad 0, \quad 0; \ldots$$
$$\phantom{G = [\,}0, \quad 1, \quad 1, \quad 0, \quad 0, \quad 0, \quad 0, \quad 0; \ldots$$
$$\phantom{G = [\,}0, \quad 0, \quad 1, \quad 1, \quad 0, \quad 0, \quad 0, \quad 0; \ldots$$
$$\phantom{G = [\,}0, \quad 0, \quad 0, \quad 1, \quad 1, \quad 0, \quad 0, \quad 0; \ldots$$
$$\phantom{G = [\,}0, \quad 0, \quad 0, \quad 0, \quad 1, \quad 1, \quad 0, \quad 0; \ldots$$
$$\phantom{G = [\,}0, \quad 0, \quad 0, \quad 0, \quad 0, \quad 1, \quad 1, \quad 0; \ldots$$
$$\phantom{G = [\,}0, \quad 0, \quad 0, \quad 0, \quad 0, \quad 0, \quad 1, \quad 1; \ldots$$
$$\phantom{G = [\,}0, \quad 0, \quad 0, \quad 0, \quad 0, \quad 0, \quad 0, \quad 1\,];$$

and the inverse-Gray mapping matrix is:

$$G^{-1} = \begin{bmatrix} 1, & 1, & 1, & 1, & 1, & 1, & 1, & 1; \dots \\ 0, & 1, & 1, & 1, & 1, & 1, & 1, & 1; \dots \\ 0, & 0, & 1, & 1, & 1, & 1, & 1, & 1; \dots \\ 0, & 0, & 0, & 1, & 1, & 1, & 1, & 1; \dots \\ 0, & 0, & 0, & 0, & 1, & 1, & 1, & 1; \dots \\ 0, & 0, & 0, & 0, & 0, & 1, & 1, & 1; \dots \\ 0, & 0, & 0, & 0, & 0, & 0, & 1, & 1; \dots \\ 0, & 0, & 0, & 0, & 0, & 0, & 0, & 1 \end{bmatrix}$$

From [9], we can write:

$$p_n + p_{n-1} = T_G g_{n+1} = T_G(g_n + g_{n+1}) \qquad [10]$$

where the operator "+" denotes a XOR operator. Since "g" is the Gray index, the result of the XOR operation between $g_n$ and $g_{n+1}$ is a vector with only one value of "1". The final result is then one column of the $T_G$, where the column number is determine by the location of the "1" value.

We will denote $d_n$ as the location of the value "1" in the result of the XOR operation between $g_n$ and $g_{n+1}$:

$$d_n \equiv \text{location of 1 in}(g_n + g_{n+1}) \qquad [11]$$

Then, $$p_{n+1} = p_n + T_G[d_n] \qquad [12]$$

where $T_G[d_n]$ denote column $d_n$ of matrix $T_G$.

To summarize, the Gray-based space-filling algorithm steps are:

generate $d_n$ for all n (1 to 2^N).

Calculate the matrix $T_G \equiv TG^{-1}$.

For n=1, set $g_1$ to a vector of N zeros (since the first Gray index is equal to 0).

For each n>1, use equation [12] to calculate the output index.

Since this algorithm does not require matrix multiplication, it is less than the linear based space filling.

Gray Based Hilbert Space-Filling

As was shown in section 0, the Hilbert space filling transform matrix a function of the index number (see for example section 0 for N=8).

As such, equation [10] becomes:

$$p_n + p_{n+1} = \qquad [13]$$
$$T_{G,n} g_n + T_{G,n+1} g_{n+1} = T_{G,n+1} g_{n+1} + (T_{G,n+1} + T_{G,n+1} + T_{G,n}) g_n =$$
$$= T_{G,n+1}(g_n + g_{n+1}) + (T_{G,n+1} + T_{G,n}) g_n \equiv$$
$$T_{G,n+1}(g_n + g_{n+1}) + T_{G,n,n+1} g_n$$

Thus, $$p_{n+1} = p_n + T_{G,n+1}[d_n] + T_{G,n,n+1} g_n \qquad [14]$$

where $p_1 = 0$ (the first Hilbert index is 0).

The matrix $T_{G,n+1}$ is the result of multiplying the Hilbert transform matrix (denoted as matrix T is section 0) with the inverse-Gray matrix. For N=8, this matrix is to:

$$T_{G,n+1} = \begin{bmatrix} x+y+z & \overline{x+y+z} & \overline{x+y+z} & y+z & y+z & \bar{z} & \bar{z} & 0 \\ 0 & 0 & \overline{y+z} & y+z & y+z & \bar{z} & \bar{z} & 0 \\ 0 & 0 & 0 & 0 & z & \bar{z} & \bar{z} & 0 \\ 0 & 0 & 0 & 0 & 0 & 0 & 1 & 0 \\ \overline{x+y+z} & x+y+z & x+y+z & \overline{y+z} & \overline{y+z} & z & z & 1 \\ 0 & 0 & y+z & \overline{y+z} & \overline{y+z} & z & z & 1 \\ 0 & 0 & 0 & 0 & \bar{z} & z & z & 1 \\ 0 & 0 & 0 & 0 & 0 & 0 & 0 & 1 \end{bmatrix} \qquad [15]$$

where x, y and z are defined in section 0 and the index n+1 is omitted from the matrix elements.

In the general case, the structure of the matrix $T_{G,n+1}$, is as follows:

$$T_{G,n+1} = \begin{bmatrix} \bar{\sigma}_0 & \bar{\sigma}_0 & \bar{\sigma}_0 & \bar{\sigma}_1 & \bar{\sigma}_1 & \dots & \bar{\sigma}_{K-1} & \bar{\sigma}_{K-1} & \bar{\sigma}_K & \bar{\sigma}_K & 0 \\ 0 & 0 & \bar{\sigma}_1 & \sigma_1 & \sigma_1 & \dots & \bar{\sigma}_{K-1} & \bar{\sigma}_{K-1} & \bar{\sigma}_K & \bar{\sigma}_K & 0 \\ \dots & \dots & \dots & \dots & \dots & \dots & \dots & \dots & \dots & \dots & 0 \\ 0 & 0 & 0 & 0 & 0 & \dots & 0 & \sigma_K & \bar{\sigma}_K & \bar{\sigma}_K & 0 \\ 0 & 0 & 0 & 0 & 0 & \dots & 0 & 0 & 0 & 1 & 0 \\ \bar{\sigma}_0 & \bar{\sigma}_0 & \bar{\sigma}_0 & \bar{\sigma}_1 & \bar{\sigma}_1 & \dots & \bar{\sigma}_{K-1} & \bar{\sigma}_{K-1} & \sigma_K & \sigma_K & 1 \\ 0 & 0 & \sigma_1 & \bar{\sigma}_1 & \bar{\sigma}_1 & \dots & \bar{\sigma}_{K-1} & \bar{\sigma}_{K-1} & \sigma_K & \sigma_K & 1 \\ \dots & \dots & \dots & \dots & \dots & \dots & \dots & \dots & \dots & \dots & 1 \\ 0 & 0 & 0 & 0 & 0 & \dots & 0 & \bar{\sigma}_K & \sigma_K & \sigma_K & 1 \\ 0 & 0 & 0 & 0 & 0 & \dots & 0 & 0 & 0 & 0 & 1 \end{bmatrix} \qquad [16]$$

where $\sigma_l$ is the partial sum defined in [4].

As can be notice, the matrix has the following properties:
1. Matrix elements are constructed from the partial sum (see [4]), '1's and '0's.
2. The bottom N/2 rows are the inverse of the upper N/2 rows for all $\sigma_l$ elements (and the last column).
3. Each row contains an alternative pair of $\sigma_l$ (starting from column N−1 in decreasing order), where the inverse operation alternates between pairs. The last pair (in the decreasing order) duplicates one of its element one more time with an inverse operation.

The structure of the matrix in [16] is for even N/2. For odd N/2, the a elements at the beginning of each row will be inverted. So, for example, for N=6, the first row in [16] is: [$\bar{\sigma}_0$ $\sigma_0$ $\sigma_0$ $\bar{\sigma}_1$ $\bar{\sigma}_1$ 0]. Note that if one builds the matrix starting from column N in decreasing order, this behavior follows naturally.

We should remember that the variables $\sigma_l$ (defined in [4]) are a function of an input linear index. As this section deals with Gray input index, this may present a problem. In general, the linear index is a simple counter index (increases by one for each output index), which means that it can also be used here (in addition to the input gray index, as an internal counter). However, if one prefers to use only Gray indexes, then the following can be used.

Due to the nature of the inverse Gray matrix (refer to section 0 for N=8 example of the inverse-Gray matrix transform), the following relationship between the linear index ([2]) bit and the Gray index bit can be derived:

$$i_n = \sum_{l=n}^{N-1} g_l \qquad [17]$$

where the summation label refer to XOR operations, 'i' refer to the linear index bits and 'g' refer to the Gray index bits.

Thus, following [3], $$s_n = i_{2(n+1)} + i_{2(n+1)+1} = \sum_{l=2(n+1)}^{N-1} g_l + \sum_{l=2(n+1)+1}^{N-1} g_l = g_{2(n+1)} \quad [18]$$

for $n = 0, \ldots, K$ where, again, all operations are XOR operations. Equation [18] basically means that the digit sum is equal to the corresponding Gray index bit. Thus, using [18], the partial sum ([4]) can be derived as a function of the Gray indexes.

The matrix $T_{G,n,n+1}$ is the result of the XOR operation between $T_{G,n}$ and $T_{G,n+1}$. For N=8, it is equal to:

$$T_{G,n,n+1} = \begin{vmatrix} A & A & A & B & B & C & C & 0 \\ 0 & 0 & B & B & B & C & C & 0 \\ 0 & 0 & 0 & 0 & C & C & C & 0 \\ 0 & 0 & 0 & 0 & 0 & 0 & 0 & 0 \\ A & A & A & B & B & C & C & 0 \\ 0 & 0 & B & B & B & C & C & 0 \\ 0 & 0 & 0 & 0 & C & C & C & 0 \\ 0 & 0 & 0 & 0 & 0 & 0 & 0 & 0 \end{vmatrix} \quad [19]$$

Where, $$A \equiv (x_n + x_{n+1}) + (y_n + y_{n+1}) + (z_n + z_{n+1}) \quad [20]$$
$$B \equiv (y_n + y_{n+1}) + (z_n + z_{n+1})$$
$$C \equiv (z_n + z_{n+1})$$

As can be notice, the matrix $T_{G,n,n+1}$ has the following attributes:

The matrix is symmetric about the rows (rows 1 to 4 are equal to rows 5 to 8).

The 4'th and 8'th output are always 0.

This means that only the first 3 rows of the matrix are required to perform multiplication.

Furthermore, the values of A, B and C can be derived as follows (for N=8):

$A = B = C = 0;$ [21]

if( $d_n$ == 3 )

$A = 1;$ else if( $d_n$ == 5 )

{

$A = 1;$ $B = 1;$

} else if( $d_n$ == 7 )

{

$A = 1;$ $B = 1;$ $C = 1;$

}

As such, there are only 4 possibilities for matrix $T_{G,n,n+1}$.

A=B=C=1. This is used only twice for N=8 (to calculate the 65'th and 193'rd outputs).

A=B=1 and C=0. This is used eight times for N=8 (to calculate the following outputs: 17'th, 49'th, 81'th, 113'th, 145'th, 177'th, 209'th and 241'st).

A=1 and B=C=0. This is used 32 time for N=8 (to calculate the following outputs: 5'th, 13'th, 21'st, 29'th, 37'th, 45'th, 53'rd, 61'st, 69'th, 77'th, 85'th, 93'rd, 101'st, 109'th, 117'th, 125'th, 133'rd, 141'st, 149'th, 157'th, 165'th, 173'rd, 181'st, 189'th, 197'th, 205'th, 213'th, 221'st, 229'th, 237'th, 245'th and 253'rd).

A=B=C=0. In this case the matrix is equal to zero and no computation is needed. This is used in most of the cases (256−2−8−32=214 times).

Note also that there is no need to keep explicitly the values of $g_n$ for all n to compute equation [14]. Since $d_n$ holds the position of "1" in the result of $g_n+g_{n+1}$, the value $g_n$ can be computed recursively as follows:

$$g_n = g_{n-1} + 2^{(d_{n-1}-1)} \quad [22]$$

where $g_1$=0(first Gray index).

Properties of $T_{G,n,n+1}g_n$

The computation of $T_{G,n,n+1}g_n$ is needed only when the matrix elements are different than zero, which means if A=1, or A=B=1 or A=B=C=1. Appendix A provides the computation outputs information.

As can be notice from the Appendix, the following rule can be used to construct the result of $T_{G,n,n+1}g_n$, without performing the matrix multiply operation:

if(($d_n$ == 3) && ($g_n[3]$ == 0)) [23]

$T_{G,n,n+1}g_n$ = [10001000];

elseif(($d_n$ == 5) && ($g_n[5]$ == 0))

$T_{G,n,n+1}g_n$ = [11001100];

elseif(($d_n$ == 7) && ($g_n[7]$ == 0))

$T_{G,n,n+1}g_n$ = [11101110];

else $T_{G,n,n+1}g_n$ = [00000000];

Alternatively, a toggle operation can be used for each value of $d_n$ in the {3, 5, 7} range. For example, when $d_n$ is equal to 3, then for each $g_n$, the output of $T_{G,n,n+1}g_n$ operation will toggle between [10001000] and [00000000] values.

Another method to generate the output of $T_{G,n,n+1}g_n$ operation is as follows:

if(($d_n$ == 3)||($d_n$ == 5)||($d_n$ == 7)) [24]

{ if($g_n[d_n]$ == 0)

{

$s = 2^{\text{floor}(d_n/2)} - 1$ // s contains 4 bits $T_{G,n,n+1}g_n = [s, s]$

}

}

-continued else $$T_{G,n,n+1}g_n = [00000000]$$

where the ">>" operation denotes a shift to the right operation (with truncation), and "floor" operator perform truncation.

For the general case (N=2^k), to calculate $T_{G,n,n+1}g_n$, we have:

$$\begin{aligned}
&\text{if}((d_n == 3, 5, \ldots N-1)) \quad \text{// either one} \quad [25]\\
&\{\\
&\quad \text{if}(g_n[d_n] == 0)\\
&\quad \{\\
&\quad\quad s = 2^{floor(d_n/2)} - 1 \quad \text{// } s \text{ contains} N/2 \text{ bits}\\
&\quad\quad T_{G,n,n+1}g_n = [s, s]\\
&\quad \}\\
&\}\\
&\text{else}\\
&\quad T_{G,n,n+1}g_n = \text{vector\_of\_N\_zeros}
\end{aligned}$$

To summarize, the Hilbert Gray-based space-filling algorithm steps are:
1. Generate $d_n$ for all n (0 to 2^N−1).
2. For each n>0, calculate the matrix $T_{G,n+1}$ using equation [16]. Select column $d_n$ from the matrix.
3. Calculate $T_{G,n,n+1}g_n$ using [25].
4. Calculate the output index using equation [14].

In other words, the Hilbert Gray-based algorithm follows the general steps of:
1. Generating the differential information between two consecutive Gray indexes.
2. Select the appropriate column in the combined $T_{G,n+1} = TG^{-1}$ matrix.
3. Calculating the Gray index transform $T_{G,n,n+1}g_n$ using simple shift operation.
4. Generating the Hilbert output index using steps 2 and 3.

Appendix A-$T_{G,n,n+1}g_n$ Behavior

The following are the $T_{G,n,n+1}g_n$ input and output operands, for N=8, where: 'count1' denotes 'n+1', 'diff_g(n)' is $d_n$, 'g(n)' is $g_n$ and 'out(n+1)' is the result of $T_{G,n,n+1}g_n$. The bit values (written inside a square bracket) are written left to right (LSB is the left most bit and MSB is the right most bit).

A=1, B=1, C=1
count1(=n+1)=65, diff_g(n)=7: g(n)=32 [0 0 0 0 0 1 0 0], out(n+1)=119 [1 1 1 0 1 1 1 0]
count1(=n+1)=193, diff_g(n)=7: g(n)=224 [0 0 0 0 0 1 1 1], out(n+1)=0 [0 0 0 0 0 0 0 0]
A=1, B=1, C=0
count1(=n+1)=17, diff_g(n)=5: g(n)=8 [0 0 0 1 0 0 0 0], out(n+1)=51 [1 1 0 0 1 1 0 0]
count1(=n+1)=49, diff_g(n)=5: g(n)=56 [0 0 0 1 1 1 0 0], out(n+1)=0 [0 0 0 0 0 0 0 0]
count1(=n+1)=81, diff_g(n)=5: g(n)=104 [0 0 0 1 0 1 1 0], out(n+1)=51 [1 1 0 0 1 1 0 0]
count1(=n+1)=113, diff_g(n)=5: g(n)=88 [0 0 0 1 1 0 1 0], out(n+1)=0 [0 0 0 0 0 0 0 0]
count1(=n+1)=145, diff_g(n)=5: g(n)=200 [0 0 0 1 0 0 1 1], out(n+1)=51 [1 1 0 0 1 1 0 0]
count1(=n+1)=177, diff_g(n)=5: g(n)=248 [0 0 0 1 1 1 1 1], out(n+1)=0 [0 0 0 0 0 0 0 0]
count1(=n+1)=209, diff_g(n)=5: g(n)=168 [0 0 0 1 0 1 0 1], out(n+1)51 [1 1 0 0 1 1 0 0]
count1(=n+1)=241, diff_g(n)=5: g(n)=152 [0 0 0 1 1 0 0 1], out(n+1)=0 [0 0 0 0 0 0 0 0]
A=1, B=0, C=0
count1(=n+1)=5, diff_g(n)=3: g(n)=2 [0 1 0 0 0 0 0 0], out(n+1)=17 [1 0 0 0 1 0 0 0]
count1(=n+1)=13, diff_g(n)=3: g(n)=14 [0 1 1 1 0 0 0 0], out(n+1 1)=0 [0 0 0 0 0 0 0 0]
count1(=n+1)=21, diff_g(n)=3: g(n)=26 [0 1 0 1 1 0 0 0], out(n+1)=17 [1 0 0 0 1 0 0 0]
count1(=n+1)=29, diff_g(n)=3: g(n)=22 [0 1 1 0 1 0 0 0], out(n+1)=0 [0 0 0 0 0 0 0 0]
count1(=n+1)=37, diff_g(n)=3: g(n)=50 [0 1 0 0 1 1 0 0], out(n+1)=17 [1 0 0 0 1 0 0 0]
count1(=n+1)=45, diff_g(n)=3: g(n)=62 [0 1 1 1 1 1 0 0], out(n+1)=0 [0 0 0 0 0 0 0 0]
count1(=n+1)=53, diff_g(n)=3: g(n)=42 [0 1 0 1 0 1 0 0], out(n+1)=17 [1 0 0 0 1 0 0 0]
count1(=n+1)=61, diff_g(n)=3: g(n)=38 [0 1 1 0 0 1 0 0], out(n+1)=0 [0 0 0 0 0 0 0 0]
count1(=n+1)=69, diff_g(n)=3: g(n)=98 [0 1 0 0 0 1 1 0], out(n+1)=17 [1 0 0 0 1 0 0 0]
count1(=n+1)=77, diff_g(n)=3: g(n)=110 [0 1 1 1 0 1 1 0], out(n+1)=0 [0 0 0 0 0 0 0 0]
count1(=n+1)=85, diff_g(n)=3: g(n)=122 [0 1 0 1 1 1 1 0], out(n+1)=17 [1 0 0 0 1 0 0 0]
count1(=n+1)=93, diff_g(n)=3: g(n)=118 [0 1 1 0 1 1 1 0], out(n+1)=0 [0 0 0 0 0 0 0 0]
count1(=n+1)=101, diff_g(n)=3: g(n)=82 [0 1 0 0 1 0 1 0], out(n+1)=17 [1 0 0 0 1 0 0 0]
count1(=n+1)=109, diff_g(n)=3: g(n)=94 [0 1 1 1 1 0 1 0], out(n+1)=0 [0 0 0 0 0 0 0 0]
count1(=n+1)=117, diff_g(n)=3: g(n)=74 [0 1 0 1 0 0 1 0], out(n+1)=17 [1 0 0 0 1 0 0 0]
count1(=n+1)=125, diff_g(n)=3: g(n)=70 [0 1 1 0 0 0 1 0], out(n+1)=0 [0 0 0 0 0 0 0 0]
count1(=n+1)=133, diff_g(n)=3: g(n)=194 [0 1 0 0 0 0 1 1], out(n+1)=17 [1 0 0 0 1 0 0 0]
count1(=n+1)=141, diff_g(n)=3: g(n)=206 [0 1 1 1 0 0 1 1], out(n+1)=0 [0 0 0 0 0 0 0 0]
count1(=n+1)=149, diff_g(n)=3: g(n)=218 [0 1 0 1 1 0 1 1], out(n+1)=17 [1 0 0 0 1 0 0 0]
count1(=n+1)=157, diff_g(n)=3: g(n)=214 [0 1 1 0 1 0 1 1], out(n+1)=0 [0 0 0 0 0 0 0 0]
count1(=n+1)=165, diff_g(n)=3: g(n)=242 [0 1 0 0 1 1 1 1], out(n+1)=17 [1 0 0 0 1 0 0 0]
count1(=n+1)=173, diff_g(n)=3: g(n)=254 [0 1 1 1 1 1 1 1], out(n+1)=0 [0 0 0 0 0 0 0 0]
count1(=n+1)=181, diff_g(n)=3: g(n)=234 [0 1 0 1 0 1 1 1], out(n+1)=17 [1 0 0 0 1 0 0 0]
count1(=n+1)=189, diff_g(n)=3: g(n)=230 [0 1 1 0 0 1 1 1], out(n+1)=0 [0 0 0 0 0 0 0 0]
count1(=n+1)=197, diff_g(n)=3: g(n)=162 [0 1 0 0 0 1 0 1], out(n+1)=17 [1 0 0 0 1 0 0 0]
count1(=n+1)=205, diff_g(n)=3: g(n)=174 [0 1 1 1 0 1 0 1], out(n+1)=0 [0 0 0 0 0 0 0 0]
count1(=n+1)=213, diff_g(n)=3: g(n)=186 [0 1 0 1 1 1 0 1], out(n+1)=17 [1 0 0 0 1 0 0 0]
count1(=n+1)=221, diff_g(n)=3: g(n)=182 [0 1 1 0 1 1 0 1], out(n+1)=0 [0 0 0 0 0 0 0 0]
count1(=n+1)=229, diff_g(n)=3: g(n)=146 [0 1 0 0 1 0 0 1], out(n+1)=17 [1 0 0 0 1 0 0 0]
count1(=n+1)=237, diff_g(n)=3: g(n)=158 [0 1 1 1 1 0 0 1], out(n+1)=0 [0 0 0 0 0 0 0 0]

count1(=n+1)=245, diff_g(n)=3: g(n)=138 [0 1 0 1 0 0 0 1],
    out(n+1)=17 [1 0 0 0 1 0 0 0]
count1(=n+1)=253, diff_g(n)=3: g(n)=134 [0 1 1 0 0 0 0 1],
    out(n+1)=0 [0 0 0 0 0 0 0 0]

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures. It is intended that the scope of the appended claims include such changes and modifications.

What is claimed is:

1. A method of obtaining a Hilbert index from a linear-based index, the method comprising the step of:
    performing a bit-wise transformation on the linear-based index to obtain the Hilbert index;
    wherein the step of performing includes the steps of:
    selecting an input index length that corresponds to the linear-based index, where the input index length is an even integer greater than or equal to 2;
    constructing a Hilbert transform matrix for each linear-based index digit, wherein each Hilbert transform matrix is filled using digit sums of the associated linear-based index digit, partial sums of the associated linear-based index digit, zeros and ones; and
    multiplying each linear-based index digit with the associated Hilbert transform matrix to obtain the Hilbert index that contains the associated Hilbert index digits;
    wherein the step of constructing each Hilbert transform matrix includes the steps of:
    setting the input index I to 0;
    computing digit sums of the set input index using equation $$S_n = i_{2(n+1)} + i_{2(n+1)+1}, \text{ for } n = 0, \ldots K, \text{ where } K = \frac{N}{2} - 2;$$

computing partial sums of the set input index using $$\sigma_l = \sum_{n=l}^{K} S_n, \text{ for } l = 0, \ldots K;$$

constructing the Hilbert transform matrix for that set input index; and
incrementing the set input index by 1 to obtain a new set input index until the new set input index is equal to the input index length minus 1, such that for each new set input index the steps of computing the digit sums, computing the partial sums, and constructing the Hilbert transform matrix are repeated to obtain digit sums, partial sums and the Hilbert transform matrix for each set input index;
wherein at least said steps of selecting, constructing and multiplying are automatically performed using a computer processor.

2. The method according to claim 1 wherein the steps of selecting, constructing and multiplying are automatically performed using at least some logic circuitry to obtain the Hilbert index.

3. The method according to claim 1 wherein the steps of selecting, constructing and multiplying are automatically performed entirely using logic circuitry to obtain the Hilbert index.

4. The method according to claim 1 wherein each of the associated Hilbert index digits are precalculated and stored in a memory as precalculated Hilbert index digits; and further including the step of:
    receiving a particular linear based index digit;
    and retrieving from the memory, using the particular linear based index digit, an associated one of the precalculated Hilbert index digits.

* * * * *